(12) United States Patent
Hander et al.

(10) Patent No.: US 7,376,552 B2
(45) Date of Patent: May 20, 2008

(54) TEXT GENERATOR WITH AN AUTOMATED DECISION TREE FOR CREATING TEXT BASED ON CHANGING INPUT DATA

(75) Inventors: William B. Hander, Louisville, CO (US); Ariel De La Lama, Longmont, CO (US); John W. Leslie, Longmont, CO (US); Fredrick E. Levine, Boulder, CO (US); James Tanner, Boulder, CO (US)

(73) Assignee: Wall Street on Demand, Boulder, CO (US)

( * ) Notice: Subject to any disclaimer, the term of this patent is extended or adjusted under 35 U.S.C. 154(b) by 881 days.

(21) Appl. No.: 10/639,274

(22) Filed: Aug. 12, 2003

(65) Prior Publication Data
US 2005/0039107 A1 Feb. 17, 2005

(51) Int. Cl.
*G06F 17/27* (2006.01)
(52) U.S. Cl. .................................. 704/9; 704/7; 704/1
(58) Field of Classification Search ............. 704/1–10, 704/251, 252, 257, 270; 715/501.1
See application file for complete search history.

(56) References Cited

U.S. PATENT DOCUMENTS

| | | | |
|---|---|---|---|
| 5,088,039 A | 2/1992 | Kugimiya et al. | |
| 5,369,574 A | 11/1994 | Masegi et al. | |
| 5,423,033 A | 6/1995 | Yuen | |
| 5,890,182 A | 3/1999 | Yagisawa et al. | |
| 5,987,404 A | 11/1999 | Della Pietra et al. | |
| 6,338,034 B1 | 1/2002 | Ishikawa et al. | |
| 6,442,545 B1 | 8/2002 | Feldman et al. | |
| 6,523,031 B1 | 2/2003 | Goeser | |
| 2003/0036898 A1 | 2/2003 | Duan et al. | |
| 2004/0168119 A1* | 8/2004 | Liu et al. .................. | 715/501.1 |

* cited by examiner

*Primary Examiner*—Huyen X. Vo
(74) *Attorney, Agent, or Firm*—Marsh Fischmann & Breyfogle, LLp; Kent A. Lembke

(57) ABSTRACT

A method for generating text using a computer system. The method includes selecting a model for generating a text that is based on a decision tree with nodes having one buckets or elements that include a conditional element and a sentence element or a pointer to a child node. The method includes processing a set of raw data selected for the particular model and then determining values of model variables. Evaluation of the model is performed to identify a set of the sentence elements to include in the text. The evaluating includes processing the conditional element of the buckets and when the conditional element is satisfied including the bucket's sentence element in the set of identified sentence elements. The method continues with combining the identified sentence elements to generate the text. The combining is completed based on concatenation rules provided in or linked to each node.

17 Claims, 5 Drawing Sheets

TEXT GENERATOR WITH AN AUTOMATED DECISION TREE FOR CREATING TEXT BASED ON CHANGING INPUT DATA

BACKGROUND OF THE INVENTION

1. Field of the Invention

The present invention relates generally to methods and systems for using computers and software for generating text and documents, and more particularly, to a computer-based method and system for generating sentences and paragraphs based on collected raw data, one or more user inputs, and a processing engine that builds a text or document in real time using a text model that includes a decision tree. The engine uses the raw data and the decision tree, both of which were selected based on the user input, to automatically select appropriate predefined sentence elements for the text being built and combines the selected sentence elements based on a set of connector rules provided in the text model and in an order defined by the text model.

2. Relevant Background.

Today, the world looks to the Internet and web-based information and news services to obtain all or a large percentage of their daily news and to perform research on numerous topics. Most of these people demand that the information provided by the web-based services be fresh, with updates provided on a very frequent basis. For example, in the financial industry, users want to know the current status of the stock and commodities markets and a particular stock or commodity, not what occurred yesterday or even a few hours ago. Likewise, sports enthusiasts want to follow the action of games and tournaments in real time as if they were watching or listening to the game live. Similarly, weather reports are expected to be tailored to a particular activity and geographic area and to provide more up-to-date information than is provided by newspapers. There are many other examples of users obtaining information online over the Internet, but a common theme is that users expect and demand that the information be current or at least fresher than information provided in printed sources.

An advantage that printed sources provide over many online sources is that a writer has taken the time to process a volume of information, such as stock exchange data, has condensed the data into a useful amount, and importantly, has written sentences or text that can easily be read and understood by a reader of the printed source. To provide a similar service, online services in some cases have resorted to providing teams of writers whose task is to quickly digest incoming data and provide text, but this solution has proven to be unworkable in most cases and typically results in a significant delay. More and more, online services are attempting to provide information in real time by having a computer and associated software applications generate text and charts or other graphics based on collected and processed raw data. The computer-generated text needs to be updated on an ongoing or periodic basis as the raw data, such as weather information or the status of an athletic event, is rapidly changing. To date, a number of approaches of generating text with computers and software have been implemented, but none have fully addressed the demands of the online information industry for providing real-time text that is useful to readers or subscribers and that effectively simulates text written by a human writer in a time-sensitive manner.

A common text updating approach used by online information services is to provide fill-in-the-blanks text in which the blanks are updated based on processed current data. In these services, a form sentence or paragraph is provided in which one or more words are changed based on current information. However, the majority of the text is repeated regardless of the current information or the content of the user request, and the repeated text may be irrelevant and even misleading to the reader. For example, a user may request stock market or trading information by inputting a stock name or symbol. The online service uses a software application that retrieves at least some current market data and information on the stock and returns text to the user. The returned text typically includes one or two sentences that are provided for any input stock such as "The market is up/down today" which is generated by selecting the word "up" or the word "down" based on the retrieved data. The application may further provide another sentence that states "The XXX stock is at $20" with the "XXX" being provided from the user input and the "$20" being provided from processed current data. Further, a number of sentences or paragraphs may be included in the returned text that are generic to the market, i.e., not updated for the stock input, or that are specific to the stock but not currently updated, i.e., written by a human some time prior to the user request and input. For example, "Stock analysts rank this stock a buy" with this repeated text being provided regardless of current conditions. In some cases, data is provided in raw form without descriptive text, such as financial ratios and values and graphs, which are difficult for average users to read or understand. The resulting text of these fill-in-the-blank systems is generally rather basic and typically is stilted or otherwise readily recognizable as being machine generated. Often, such machine-generated text provides information that is not useful to the user because it is not specific to the user's input (such as a particular stock), is too simplistic (such as simply providing a stock price or whether the stock is up or down), and is locked to a single format or sentence construction with only small portions or single words being updated based on current information.

A large number of computer-based text generators have been developed in other industries, but generally, these text generators are limited to processing a pre-existing, source text to generate an output or target text and do not process current data to create a new, up-to-date text. For example, many translation systems that are computer-based have been developed, such as software applications that utilize word mapping or natural language processing techniques. These systems have been developed for translating text prepared in one language, i.e., the source document or text, into text produced in a second language, i.e., the output or target document or text. These computer-based systems generally are dictionary-based and attempt to comply with the many syntax and grammar rules present in the source and target languages to produce a target text that properly conveys the meaning of the source text. The use of computers for translation of written texts has proven difficult to implement because the rules of sentence construction, varying grammar rules, and even varying geographic lexicons of the source language are quite numerous and complex and directly effect the quality of the finished product or text. Generally, these translator tools attempt to map each word in a source document to a word in the output document while verifying that syntax and other rules of text construction have been satisfied. While providing a useful tool for generating text in a particular language, these translator and summarizing tools are not useful for creating up-to-date text for online information services from raw data or without a source document.

Hence, there remains a need for methods and systems for generating human-readable text in a timely manner from collected raw data, such as financial, weather, sports, or other content-specific information. Preferably, such methods and systems would create the text based on user input so as to create input-specific text from the collected and processed raw data. The created text also preferably would be less stilted than existing fill-in-the-blank products to provide more readable text that is much closer to human editorial text, which reads fluidly. Further, such methods and systems preferably would provide multiple models for constructing the text to limit the amount of superfluous or irrelevant information that is included in the text, and in some cases, the user may be able to select a particular model. The methods and systems preferably would act automatically to generate text without operator intervention and would be relatively easy to implement, update, and maintain.

SUMMARY OF THE INVENTION

The present invention addresses the above problems by providing a computer-based method, and corresponding systems and devices, of generating text. The method is based on the concept of modeling various texts with decision trees that have a plurality of parent and child nodes which each include one or more buckets. The buckets in turn each include a conditional or evaluation string and a pointer to a child node or a sentence element or fragment for inclusion in a generated text when the conditional is satisfied. The text is not generated by translating an existing document but instead by processing a set of raw and preferably current data that is retrieved for a particular model. An engine processes the raw data to determine the values of a number of model variables, and then processes each node in the decision tree model including the conditionals, which often include one or more of the model variables. When a conditional is satisfied, a corresponding sentence element is marked for use in the generated text or a pointer is followed to a child node that is itself evaluated. The engine continues in this fashion until the tree model is fully evaluated, and at this point, the sentence elements are concatenated in each node according to a set of concatenation rules provided in or linked to the node, which define connectors such as punctuation marks, conjunctions, and the like. In this manner, syntactic and grammar analysis does not need to be performed as these features are built into the decision tree model with the predefined set of sentence elements, the conditionals of the buckets, the linking of the nodes, and the set of concatenation rules.

More particularly, this invention provides a method for generating text. The method includes selecting a model of a text. The model is a decision tree with a node having one or more buckets that include a conditional element and a sentence element. The method continues with processing a set of raw data selected for the particular model being used to generate the text. The processing typically includes determining one or more model variables. Evaluation of the model is performed to identify a set of the sentence elements to include in the text. The evaluating includes processing the conditional element of the buckets and when the conditional element is satisfied or "TRUE," including the bucket's sentence element in the set of identified sentence elements. The method continues with combining the identified sentence elements to generate the text.

The model generally includes a plurality of nodes each having one or more buckets either pointing to another node or including a sentence element. The method may include receiving a user input, such as from a user node, that includes a unique key or index to the raw data and a model selection. Then, the method may further include selecting the model of the text based on the user's model selection and also retrieving the raw data based on the unique key (such as a stock symbol in a financial services embodiment of the invention). Each node includes a set of concatenation rules defining punctuation, conjunctions, and other connectors (such as spaces) for use in the combining step for joining two sentence elements (i.e., adjacent elements in a series). The concatenation rules are useful for avoiding the need to apply syntactic analysis, querying dictionary services, performing grammar analysis of generated text, and other actions required in typical translations systems because the concatenation rules define how sentence elements are to be combined and in some cases, grammar rules are complied with by the inclusion of additional child nodes, such as determining whether to use a plural or singular verb by pointing to a child node and providing proper conditionals in the buckets of that node.

DETAILED DESCRIPTION OF THE PREFERRED EMBODIMENTS

The present invention is directed to an improved method of generating text based on a set of collected or received raw data, such as stock analysis or other financial information. The text generation method, and corresponding system, of the invention is adapted for handling ongoing changes in the raw data to create current or up-to-date text based on user input. The user input typically includes selection of a text format (i.e., a text model) and a unique key used in the method for selecting a subset of the raw data for use in creating the text (e.g., a stock symbol in the financial-based implementation of the method). The method utilizes one or more models for the text to be built, and each of the models is a decision tree with differing root and leaf (or parent and child) node configurations. The decision tree is initially "built" by processing the raw data to determine one or more model variables. A generator engine then processes the decision tree, e.g., the conditionals in each node and buckets within the nodes, to determine a set of sentence fragments or elements to include in the text. The generator engine then combines all of the identified sentence elements according to concatenation rules provided in each node that indicates sentence and paragraph structures as well as connectors such as punctuation and connection words such as "and," "but," "or," and the like. The generated text is then returned to the requesting user for display on their user interface or in another form (such as a print form).

Figure 1:
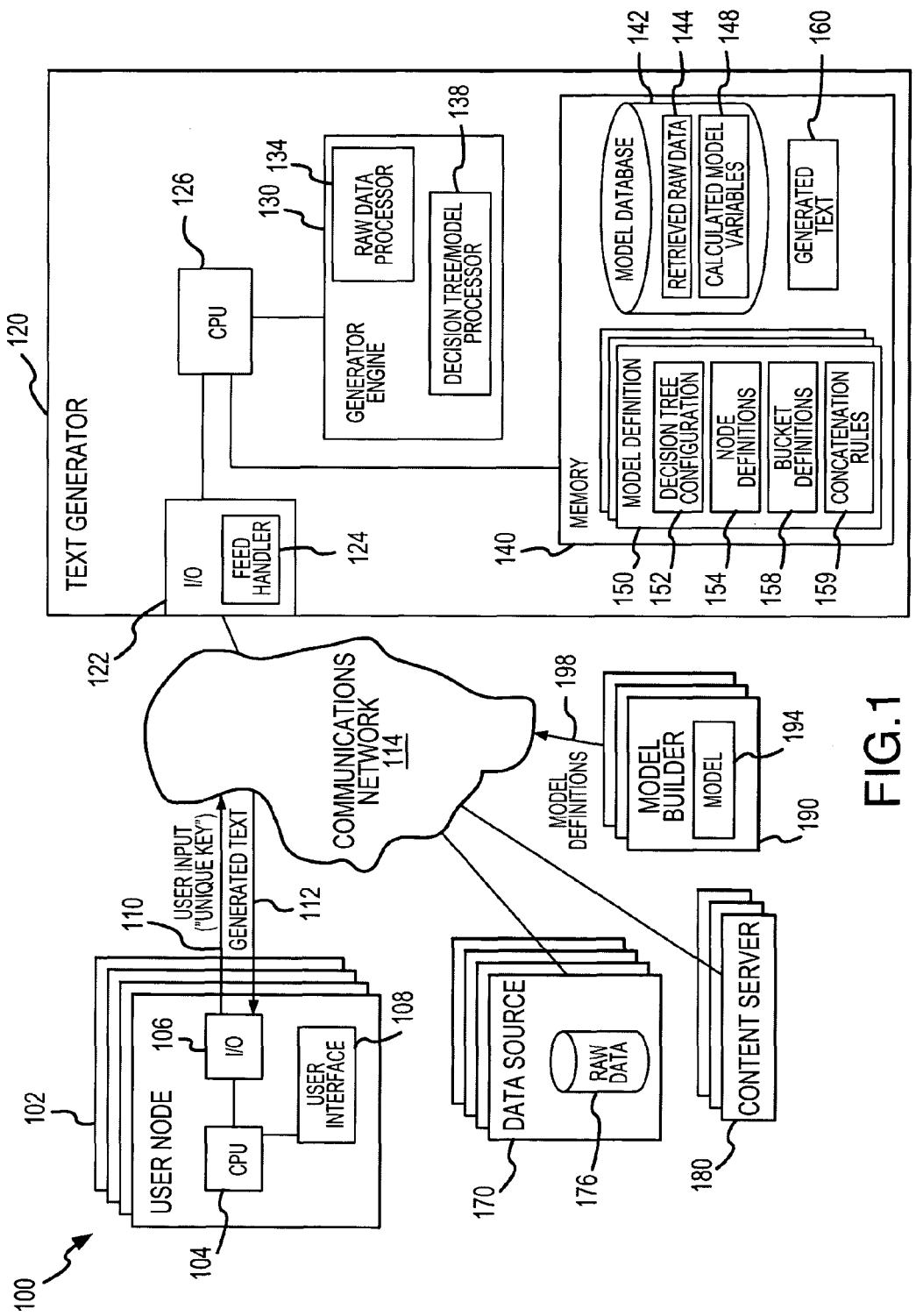
FIG. 1 is a simplified block diagram of a system for generating text according to the present invention.
Figure 3:
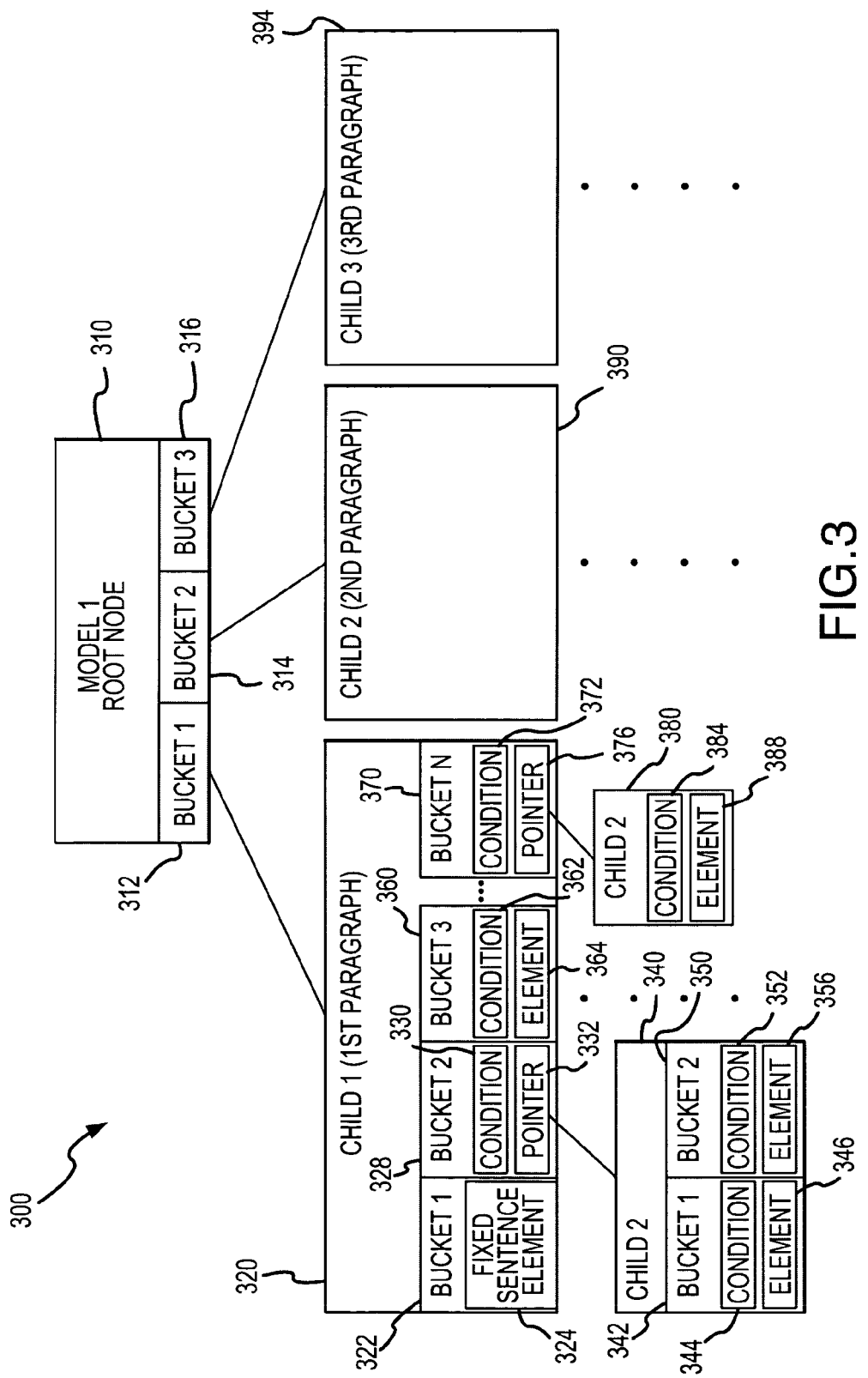
FIG. 3 illustrates in a general manner a decision tree used within the present invention for modeling a text to be generated with a generator engine.
Figure 4:
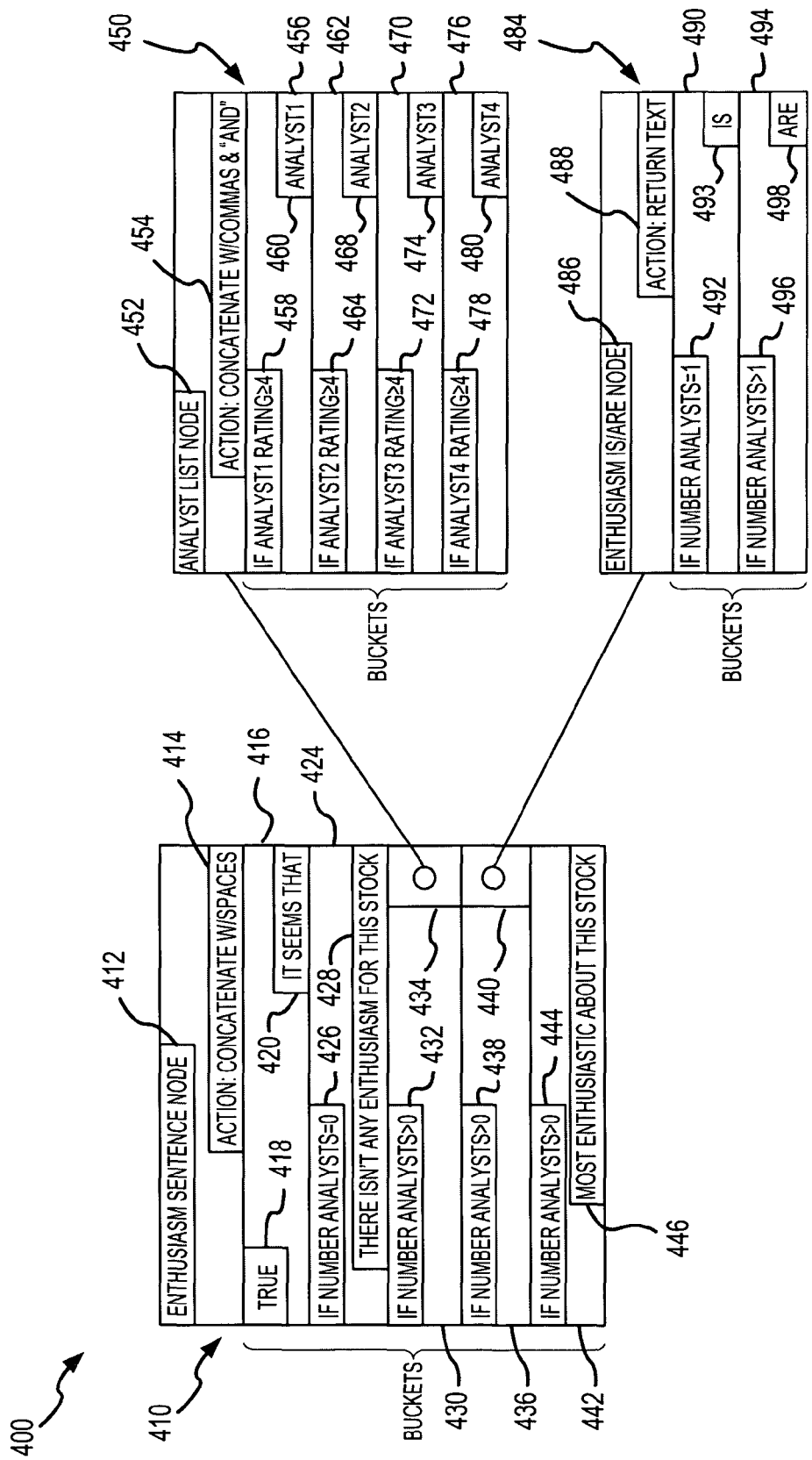
FIG. 4 is an example of a decision tree model useful for generating text, i.e., a single sentence, according to the invention and illustrates in a simple manner processes that may be repeated numerous times and in a more complex manner to generate a text having numerous sentences and paragraphs using the automated decision tree concept to generate text on-the-fly based on current raw or input data.
Figure 5:
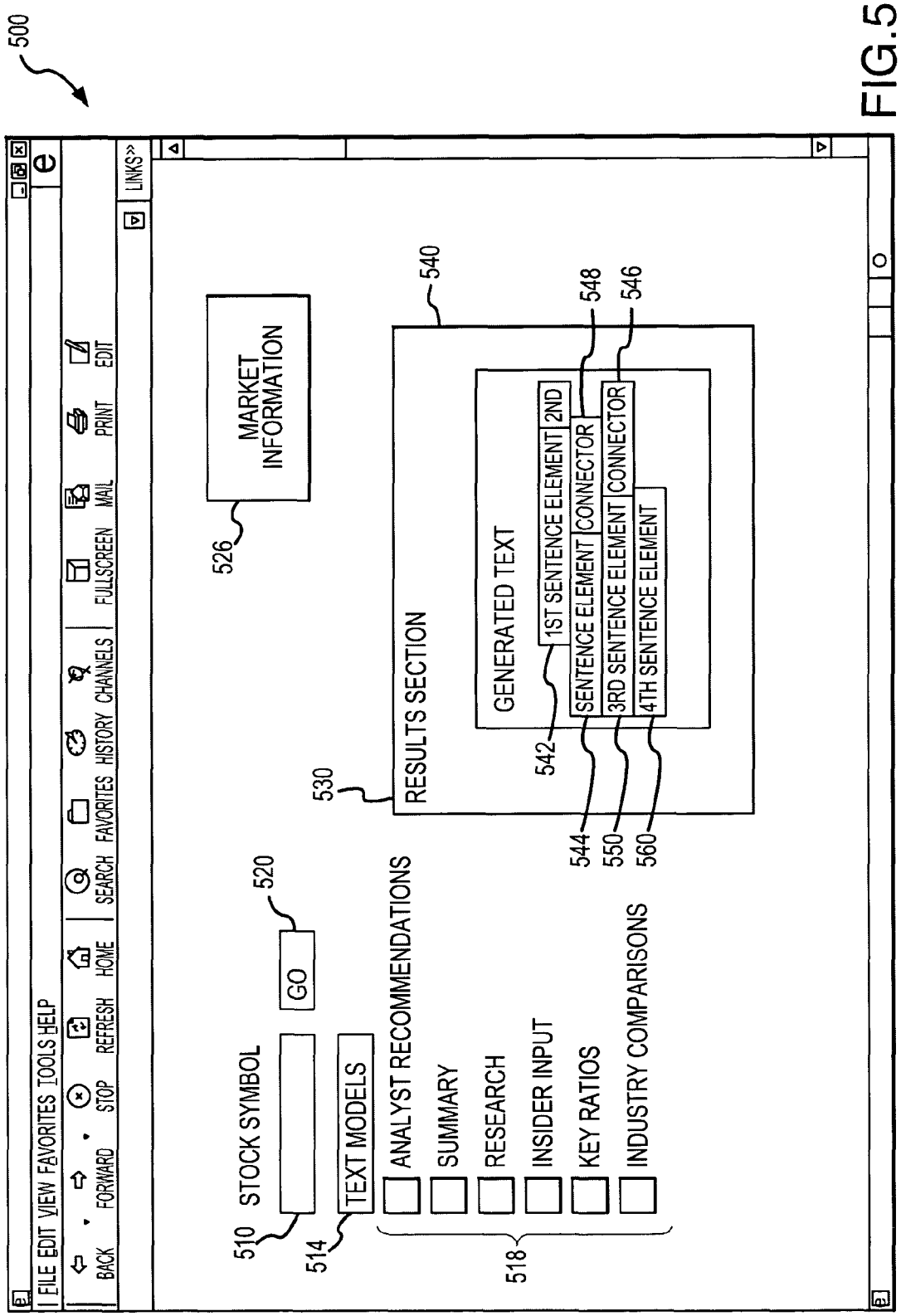
FIG. 5 illustrates a user interface that may be used in the system of FIG. 1 to prompt a user for user input, i.e., a model selection for generating the text and a unique key for selecting raw data for inclusion in the text, and for displaying the generated text to the user.

With reference to FIG. 1, the following description begins with a general overview of one exemplary system for generating text on the fly based on user requests including user inputs and on changing raw data from a data source. The description then continues with reference to FIG. 2 by providing a description of one embodiment of a text generation method of the invention such as could be implemented by the system of FIG. 1 (or with other system configurations not shown). To more fully explain the text generation method of FIG. 2 and the workings of the system in FIG. 1, FIGS. 3 and 4 are provided which show the use of decision trees as models for text built based on processed raw data and from a collection of predefined sentence elements and concatenation rules. User input is typically used to create the text and, in this regard, FIG. 5 is provided to illustrate one technique that can be used to prompt the user for the user input (e.g., model selection that defines a generated text format and content and a unique key that identifies a subset of the raw data to use in building the text according to the selected model).

FIG. 1 illustrates one embodiment of a text generating system 100 according to the invention. In the following discussion, computer and network devices, such as the software and hardware devices within the text generating system 100, are described in relation to their function rather than as being limited to particular electronic devices and computer architectures and programming languages. To practice the invention, the computer and network devices may be any devices useful for providing the described functions, including well-known data processing and communication devices and systems, such as application, database, and web servers, mainframes, personal computers and computing devices (and, in some cases, even mobile computing and electronic devices) with processing, memory, and input/output components, and server devices configured to maintain and then transmit digital data over a communications network. The user nodes and text generator may be any computer device useful for running software applications including personal computing devices such as desktops, laptops, notebooks, and handheld devices that communicate with a wired and/or wireless communication network. Data, including preprocessed report data sets and requests for data sets and transmissions to and from the elements of the system 100 and among other components of the system 100 typically is communicated in digital format following standard communication and transfer protocols, such as TCP/IP, HTTP, HTTPS, FTP, and the like, or IP or non-IP wireless communication protocols such as TCP/IP, TL/PDC-P, and the like.

Referring again to FIG. 1, the system 100 includes one or more user nodes 102 that are linked to a communications network 114, such as the Internet, a LAN, a WAN, or other digital communications network. The user nodes 102 include processors 104 for controlling operation of the user node 102 including managing memory (not shown) and running or creating a user interface 108 (such as a graphical user interface (GUI)) for allowing a user of the node 102 to view and input data. The user node or device 102 further includes an input and output device 106 for facilitating digital communications over the network 114 with a content server 180 and/or directly with the text generator 120. The user interface 108 in practice is used to view web pages or otherwise view textual and graphical information provided by the content server 180.

For example, the content provider 180 may be run by an online information service, such as a financial information service, a sports information service, a weather service, and the like, and serve information via web pages or other formats to the user node 102 for viewing with the user interface 108. An exemplary form for the user interface 108 is shown in FIG. 5, which will be described in more detail below. At this point, it is sufficient to understand that a user of the user node 102 may be prompted via the user interface 108 for user input 110 that can be transmitted to the text generator 120 directly or through the content server 180. The user input 110 may take many forms but generally includes a unique key or index that allows the text generator 120 to identify a subset of the raw data 176 to use in creating a generated text 112 that is returned to the user node 102 and displayed on the user interface 102 (or otherwise useable by the node 102 such as in a digital data file or in a print form). The user input 110 may further include a selection of a text model to use in creating the generated text 112 in embodiments where more than one model are used by the text generator 120.

Typically, a user via the graphical interface 108 is prompted to select a model and to enter a unique key. For example, in a financial information service embodiment, a user may be prompted to enter a stock symbol as the unique key and to select the type of information (i.e., the model) they desire such as a summary, insider information, research, analysts' recommendations, and the like. In a weather service example, the user may be prompted to enter a geographic location as the unique key and the model may be an activity used to rate the weather or a text format such as a 1-week forecast. Note, multiple keys can be used to further narrow the volume of raw data such as by entering a time frame for a weather forecast or a time frame for a financial analysis (e.g., the past 3 months, the past 5 years, and the like).

The system 100 further includes one or more data sources 170 that provide raw data 176 over the communications network 114 to the text generator 120. The data sources 170 typically are a source of current and changing (nearly continuously changing or at least periodically changing) data. Examples of data sources are services that gather financial information on stocks, commodities, market indicators, and numerous other financial data used by financial analysts in characterizing the market and analyzing individual stocks, bonds, commodities, and other financial products. Other examples include services that gather data on subjects or activities that typically vary over time (i.e., in which the data is changing) such as weather, sports, politics and governmental activities, and many more as the invention is not limited to a particular data source or information content. Generally, though, the raw data 176 is not fully processed and useful as-is for delivery in a generated text 112 and needs to be processed to determine parameters useful in a text model for selecting sentence elements (not shown in FIG. 1 but part of the node and bucket definitions 154 and 158) to include in the generated text 112. Also, the raw data 176 or model variables generated from the data 176 may be included in, i.e., substituted into, the generated text 112. For example, in the financial services embodiment, a price to earnings variable may be determined for a stock and then substituted into a sentence element to create the sentence element included in the generated text 112.

One or more content servers 180 are linked to the network 114 to serve information to the user node 102. In some embodiments, the content server 180 is a web server maintaining a web site and serving web pages to the user node 102. For example, the user node 102 may be a subscriber to an online service, such as financial information or other type of information service, and the content server 180 acts to deliver pages of relevant information to the user node 102. The delivered pages may include prompts for the text generator 120 to request the user input 110. The content server 180 then receives the user input 110 and delivers the information to the text generator 120 along with a request for creation of particular generated text 112, which is then delivered to the user node 102 by the text generator 120 or as part of a page served by the content server 180 (i.e., the text generator 120 transmits the generated text 160 to the content server 180 via the network 114).

In the illustrated system 100, one or more model builders 190 are included in the system 100 and are linked to the network 114. The model builders 190 may be any computer device or system useful for creating or storing a model 194. While shown as a separate entity, the model builder 190 may be included in the text generator 120 in some embodiments. The model 194, as will be explained in detail, is based on a decision tree that is configured with parent and child nodes that include conditionals that when evaluated identify which of a set of predefined sentence elements (and substituted model variables determined from the raw data when applicable) are included in a generated text 112.

The use of a decision tree as the base configuration for the model 194 addressed the goals of the inventors in creating a text generation model that is reusable, relatively easy to initially configure, and readily updated (as portions of the tree nodes and buckets can be updated without altering the entire model including changing the predefined sentence elements and model variables). Further, the tree-based model 194 does not require the presence of a person dedicated solely to maintaining the current model 194 or even to creating new ones. Once a model 194 is built, the model builder 190 can transmit the model definitions 198 to the text generator 120 via the network 114 for storage in memory 140 as a model definition 150 and for later use in generating a text 160. Another advantage of the tree-based models 194 of the present invention is model scalability. It may appear relatively straightforward to build a conditional tree with a dozen or so decision points or if statement. However, the task of creating a tree with hundreds of thousands of decision points is daunting, and maintaining such a large tree would be very difficult without the database structures, tree definitions, and database techniques of the present invention. In this manner, scalability is provided in the present invention by the ability to reuse all or part of a large decision tree in a maintainable fashion.

Significantly, the system 100 includes the text generator 120 which functions to respond to requests for text generator to build a text or document in real time based on user input 110, raw data 176, and one or more model definitions 150. An I/O device 122 is provided for communicating with devices over the network 114 and is shown to include a data feed handler 124 for processing the large volumes of raw data 176 retrieved from the data source 170 during operation of the text generator 120. A CPU 126 is provided for managing operation of the generator 120 including running software applications such as the generator engine 130 and managing memory 140.

The generator engine 130 functions to process the raw data 176 and to generate text 160 in response to requests from user node 102 and/or content provider 180. In this regard, the generator engine 130 includes a raw data processor 134 that functions to respond to text generation requests to, based on a particular model definition 150, retrieve a particular set of raw data 144 that is stored in a model database 142. The raw data processor 134 further acts to determine each of the model variables 148 in the model definition 150 that will later be used by the decision tree/model processor 138 in evaluating node and/or bucket conditions and that are also shown stored in the model database 142.

The decision tree/model processor 138 functions to first process all conditionals in a model definition 150 (retrieving portions of raw data 144 and calculated model variables 148 where necessary) so as to identify paths in the tree model 150, which identifies a set of predefined sentence elements for inclusion in the generated text 160, stored in memory 140. The model processor 138 acts second to concatenate all the identified sentence elements into a generated text 160 per a set of concatenation rules 159 provided in the model definition (e.g., typically associated with each node of the model decision tree 150). Note, concatenation typically happens after buckets of a single node in the tree have been evaluated but not necessarily after all other nodes in a tree have been evaluated. However, in some cases, concatenation of a bucket may result in a node "must" or having to occur before a parent can evaluate the return from the child node. The generated text 160 can then be transmitted via the I/O 122 to the network 114 for delivery to the user node 102 directly or through the content server 180.

As shown in FIG. 1, memory 140 is provided in the text generator 120 (or may be provided in a separate device linked to the generator 120) for storing a model database 142 that is accessible by the generator engine 130. The model database 142 generally contains all the information useful for evaluating a decision tree model 150 and for generating the text 160. To this end, the model database 142 is shown to include relevant retrieved raw data 144 and calculated model variables 148. The particular arrangement of the model database 142 is not limiting to the invention as long as the information is available to the engine 130 (and in some of the later description is described as being made available to particular nodes and/or buckets of a decision tree). The model definition(s) 150 are also stored in the memory 140 and include a decision tree configuration 152 defining the plurality of parent and child nodes of a tree.

Node and bucket definitions 154 and 158 are included for defining the conditionals that need to be evaluated and for setting forth the predefined sentence elements or fragments that are to be included in the generated text 160 based on the evaluated conditionals (such as equal to, less than, greater than, less than or equal to, and greater than or equal to, and the like). In other words, sentence elements are included when the node and/or bucket conditional is evaluated to be satisfied (i.e., to be "TRUE" rather than "FALSE"). Additionally, a set of concatenation rules 159 are stored as part of the model definition 150 (and often are associated with particular nodes so may be part of the node definitions 154). The concatenation rules 159 are important because they allow the generator engine 130 to build the text 160 in a rapid and simple manner that complies with syntax and grammar rules of a particular language (assuming proper construction of the model 150). In other words, the concatenation rules 159 when combined with the set of predefined sentence elements in the node and bucket definitions 154, 158 allow the engine 130 to function to build the text 160 without the use of dictionary look ups and without grammar and syntactic analysis that was required in many previous text building systems (e.g., ones that translate one document in a first language into a second document in a second language).

The text generator 120 of system 100 may support one or more content servers 180 and may receive model definitions 150 from one or more model builders 190. Further, many data sources 170 may be used by the text generator 120 in creating the generated text 160. For example, the text generator 120 may support a content server 180 that provides a financial information online service and in this case, the text generator 120 may allow a user node 102 to select from a plurality of models 150 in generating the text 160 with the engine 130. The retrieved raw data 144 in this case would be defined by the user-selected model 150 and by the unique key provided in the user input 110 (such as a particular stock symbol). The text generator 120 may also (or alternatively) support a weather services content server 180 and in this case the data source 170 provides weather-related information. The model definition 150 would be very different with significantly different configuration 152, node and bucket definitions 154, 158 and concatenation rules 159 used by the engine 130 in creating the text 160. However, the engine 130 would be useful for both model definitions 150. Additionally, a model definition 150 may link to or incorporate one or more other model definitions 150 with the decision tree including other decision trees or "subtrees."

Figure 2:
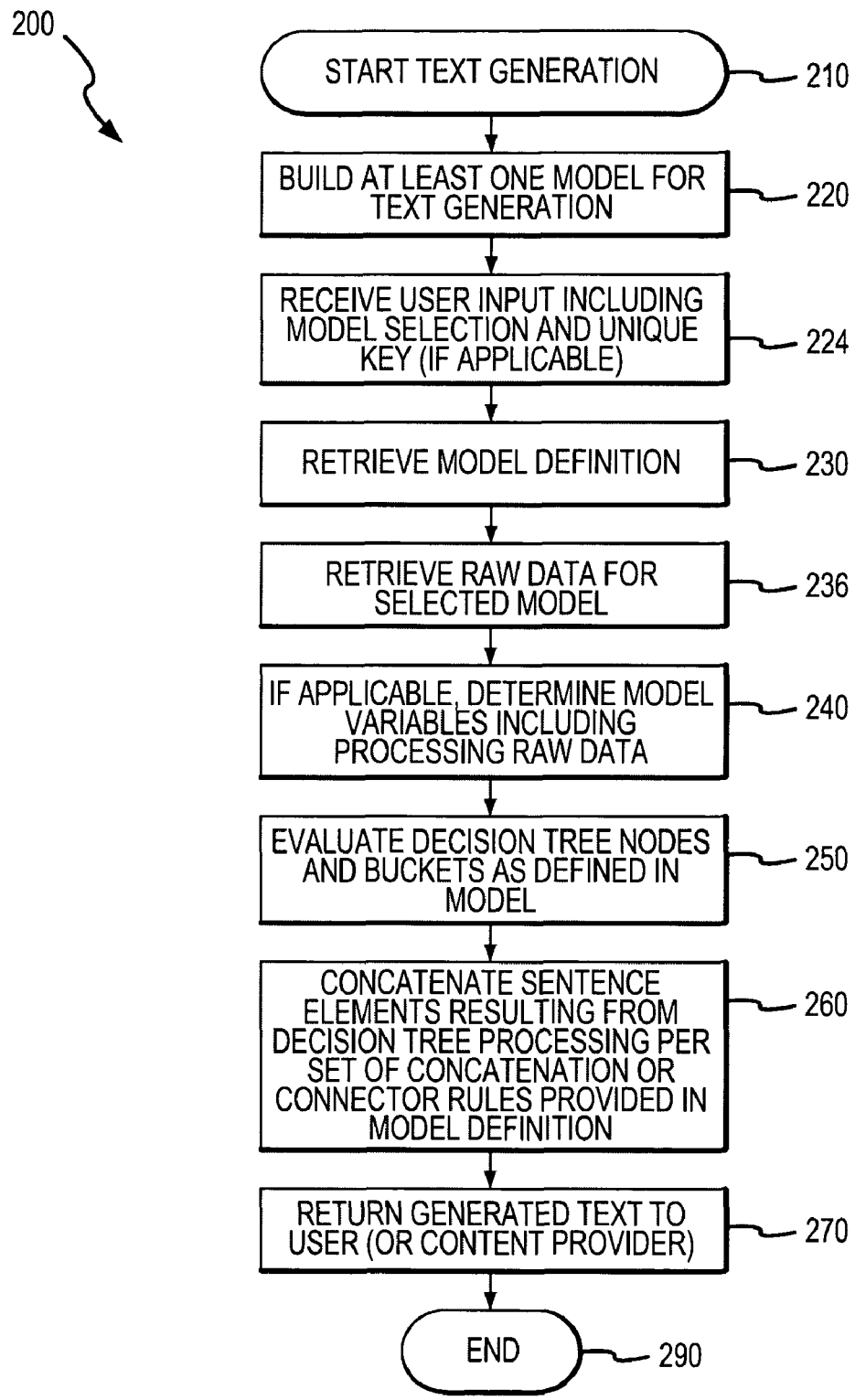
FIG. 2 is a flow chart for one exemplary method of generating text using decision tree models, such as with the text generator and engine of FIG. 1.

FIG. 2 illustrates a text generation method 200 that may be implemented by operation of the system 100 of FIG. 1 or with other systems (not shown). As shown, the method 200 begins at 210 typically with the establishment of communication links between a text generator 120, a model builder 190, a content server 180, data sources 170 (although in some cases the data sources are specified by the model or are model specific), and user nodes 102. Further, the text generator 120 is configured to run the generator engine 130 and with memory 140 for storing models 150 and model databases 142.

In one embodiment, the model database 142 is configured to support creation and running of the models 150. To this end, the model database 142 may include one or more tables (not shown in FIG. 1) for containing the appropriate values added by the raw data processor 134. When running a model 150, the table entries are used to guide the code in creating the final text 160. It is preferable than that before entering any model values that the model 150 be created (such as by the model builder 190). In one specific embodiment, the tables of the model database 142 include a data access table, a model table, a node table, and a bucket table. The purpose of the data access table is to map a name to an open database query (such as an SQL query ID) and once the query identifier is available, an entry can be added to this table. The model table acts to hold the data for each one of the models 150 to be used by the text generator 120 and each model table can be identified with a model identification or model label, which can be matched with a user input model selection to determine which model and related data shall be used by the engine 130 in creating the text 160. In this embodiment, the node table can be used for containing definitions of nodes (such as node definitions 154) along with concatenation rules (such as rules 159) for each node. The bucket table is used similarly to contain definitions for each bucket within a node.

Each bucket is under a node, and a field in the table is provided for identifying the parent node. Each bucket within a node has a unique identifier, and the engine 130 acts to evaluate the buckets in order based on their identifiers (such as smallest to largest). There are two types of buckets. One type of bucket points to other nodes in the decision tree model 150 while the other type of bucket contains a predefined set of text or a sentence element. A field in the bucket table can be used to identify the type of bucket to the engine 130. Further, the buckets may further include a criteria or conditional that needs to be evaluated by the engine to determine whether a pointer to a node should be followed or whether a predefined sentence element should be included within the generated text 160. These conditionals or criteria may be stored as scripts or formulas within another field in the bucket table.

Returning to FIG. 2, the method 200 continues with the building of at least one model or definition 150 for use by the text generator 120. In typical embodiments, a number of models 150 are created by a model builder 190 and transferred at 198 to the generator 120 for storage in memory 140. The models 194 may be built using tools such as a graphical tool with a GUI that facilitates the creation of models. For example, the GUI building tool (not shown) may include prompts for a user to enter a model identifier (or to retrieve an existing model to assist in editing). Bucket data may be entered into a data entry box as well as conditional strings or evaluation strings to define each bucket within a node. Each node may be entered and related (i.e., by defining parent and child relations as well as bucket pointer definitions each of which can be displayed in a graphical manner) to readily create a relatively complex model of a text that is to be generated. Note, the model will result in numerous texts being generated depending on the number of buckets and conditionals used in combination with the number of tree nodes utilized within a model.

At 224, user input 110 is received (such as via the content provider 180) at the text generator 120 requesting that text be built. The user input 110 includes a unique key for determining what portion of the raw data 176 is to be retrieved and stored at 144 in model database 142 (or alternatively, a relatively large portion of raw data may be stored with the anticipation that it will be used with multiple models 150 and is periodically updated). The user input 110 further includes a selection of a model 150 for use by the engine 130 in creating the text 160 (assuming there is more than one model 150 available and accessible for the user node 102).

At 230, the generator engine 130 retrieves (or identifies) the model definition 150 based on the user input 110 (or in some embodiments, the engine 130 determines the model 150 based on defaults or on input from the content server 180). At 236, the engine 130 acts to retrieve raw data 176 from data source 170 for the selected model 150 based on the definition of the nodes and buckets 154, 158. At this point, the model database 142 can be populated, which may include at 240 determining with the raw data processor 134 one or more model variables 148 associated with the model definition 150. At 250, the model processor 138 acts to evaluate the decision tree nodes and buckets as defined by the node and bucket definitions 154, 158 including evaluating each conditional reached during processing of buckets (note, not all conditionals will be processed during each evaluation due to the parent/child relationship of the nodes of the tree model 150). By completing this evaluation of conditionals, a set of predefined sentence elements are identified for inclusion in the generated text 160.

At 260, the model processor 138 acts to combine all the identified sentence elements from step 250 to create the generated text 160. Note, the combining is completed based on a set of concatenation rules 159 which, at least in one embodiment, are linked to each node such that the text in each node and bucket of that node are combined according to the concatenation rules specific to that node, thereby sidestepping problems with language grammar and syntax rules. In other words, the concatenation rules are chosen to work in every possible or allowable combination of sentence elements for that particular node (and its child nodes). The concatenation rules provide the connector elements to be used in creating the text 160 and the location of such connector elements relative to each sentence element. Again, concatenation may occur when all nodes have been evaluated or more preferably, concatenation occurs at the node level rather than after all nodes have been evaluated. Hence, it may be more accurate for FIG. 2 to include a loop back (not shown) from step 260 to 250 to more clearly indicate that concatenation generally occurs after the buckets of a single node have been evaluated.

In some embodiments of the invention during operation of the generator engine 130, a bucket returns a choice from among multiple text strings randomly or randomly from a pool without repeating in a single execution of a model 150. This allows the generator engine 130 to create sentences in the generated text 160 that have a range of conjunctions, adjectives, adverbs, or other common grammatical elements. For example, a word (or a phrase) may be randomly selected from a pool or set of synonymous words to provide a sentence element or part of a sentence element. In this manner, randomness is introduced into the generated text 160 such that the text is less obviously a machine-generated product, i.e., a document produced by the text generator 130 is less stilted and feels more varied to a user of the node 102 than prior machine-generated, fill-in-the-blank text.

The connector elements in the English language typically include punctuation and connecting words such as "and," "or," "but," and other conjunctions. The generated text 160 may be at least temporarily stored in memory 140 and then at 270 is transferred to the user node 102 (such as via the content server 180). In some embodiments, the generated text 112 is received at the user node as part of a web page and is displayed on the user interface 108 for reading, storage, printing, and/or other uses by the user of the node 102. The text generation process 200 then ends at 290 and the text generator 120 awaits the next user request.

FIG. 3 illustrates in general terms a model 300 of the invention (such as models 150, 194) that model text generation with a conditional decision tree. Basically, a tree model 300 is a parent-child approach in which a parent or root node can have multiple children and in addition, each child or leaf node can be a parent node. The more complex the text being modeled with model 300 the larger the number of nodes that will be required. As shown, the model 300 includes a root node 310 with three buckets 312, 314, and 316 that point to three child nodes 320, 390, and 394. The child nodes are shown to model a first, second, and third paragraph in a text. The child nodes 320, 390, 394 could also have represented single sentences, portions of sentences, or larger portions of a text.

Node 320 is useful for showing that multiple buckets may be provided within a node 320 and that each bucket may be defined differently to achieve a desired text and alternative or variety of texts based on the result of conditionals or condition strings within the buckets. As shown, a first bucket 322 does not include a condition string but simply includes a fixed sentence element 324, with the element being fixed because it is included in the text created with the model 300 every time child node 320 is reached or evaluated. A second bucket 328 is evaluated after the first bucket 322 and includes a condition string 330 that must be evaluated by an engine processing the model 300 to create a text. If the condition 330 is satisfied or "TRUE," then the pointer 332 is followed by the engine to a child node 340 of the node 320. At node 340, a pair of buckets 342, 350 are each evaluated by processing the conditions 344, 352 to determine if the elements 346, 356 should be inserted in the text after the first bucket 322 fixed sentence element 324.

Next, a third bucket 360 is evaluated by processing the condition or evaluation string 362 to determine whether it is proper to include the sentence element 364 in the text. A number of other buckets may be included in the paragraph modeled by the node 320 with a final bucket 370 being evaluated by processing the condition 372 to see if pointer 376 should be followed to child node 380, which in turn is evaluated by processing condition 384 to determine whether sentence element 388 should be included within the paragraph represented by 320. An engine would then proceed to evaluating the nodes 390 and 394 to determine which sentence elements in the nodes 390, 394 should be included in a text generated based on the model 300. Although not shown, each node 320, 340, 380, 390, and 394 would typically include concatenation rules for combining the various elements that are determined or identified for inclusion within the text. In preferred embodiments, concatenation then occurs on a node basis or level, with concatenation being performed upon the completion of evaluating a particular node. The condition or evaluation strings are evaluated using raw data and/or model variables determined by the engine. Further, generation of the text typically will include substitution of model variables into a string or sentence element for inclusion within the generated text, e.g., to include a portion of the fresh or new data retrieved by the text generator.

To further understanding of modeling according to the invention, FIG. 4 provides a simple but useful example of a model 400 that can be used by an engine to generate a text having a single sentence (but that may vary significantly depending on the changes to the raw data). The model 400 is typical of text that may be provided by a text generator used in conjunction with a financial or investing information service. As shown, a root node 410 is provided with a node label or identifier 412 of "Enthusiasm Sentence." Associated with the node 410 is a set of concatenation rules 414, which in this example indicates to an engine that the sentence elements should be combined with spaces between the elements. The root node 410 includes a number of buckets 416, 424, 430, 436, 442 that when combined define the sentence or generated text of the model 400. Each bucket 416, 424, 430, 436, 442 has a condition 418, 426, 432, 438, 444 that is to be evaluated by an engine to determine whether the corresponding text or sentence elements 416, 428, 446 should be included in the generated text or whether the pointers 434, 440 should be followed to child nodes 450, 484.

In this regard, the engine needs the model variables indicated in these conditionals and in the buckets of nodes 450, 484. In some embodiments, the model variables are identified initially by the engine once the model has been selected and then determined for creation of the model database. In other embodiments, the engine determines the variables on the fly only when they are encountered as part of the model evaluation process (which in the case of very large trees may be more efficient as many nodes and buckets may never be reached making the evaluation of all possible variables irrelevant). So as shown, the model variables "NumberAnalysts," "Analyst1Rating," "Analyst2Rating,"

"Analyst3Rating," and "Analyst4Rating" need to be determined by the engine to evaluate the model 400 and its buckets.

During operation or evaluation, the bucket 416 is evaluated and the conditional is satisfied (e.g., is always "TRUE") and the text element 416 is marked for inclusion in the text. The engine then evaluates the conditional 426 in bucket 424, and when the variable "NumberAnalysts" is zero, the engine marks the text 428 for inclusion in the text (i.e., the generated text would simply be "It seems that there isn't any enthusiasm for this stock."). The engine then proceeds to the bucket 430 and when the variable "NumberAnalysts" is greater than zero, the pointer 434 is followed to the child node 450. In this node 450 having a label 452, a different concatenation rule set 454 is provided for joining the elements 460, 468, 474, 480 when conditionals 458, 464, 472, 478 are satisfied in buckets 456, 462, 470, 476. Once the node 450 is evaluated, it is typically concatenated (e.g., concatenation happens at a node level).

Returning to node 410, bucket 436 is evaluated by processing the conditional 438 to determine whether pointer 440 should be followed to child node 484. Child node 484 is labeled 486 and again has its own set of concatenation rules 488 (i.e., simply "return text" as there will only be one sentence element returned at a time). The node 484 has buckets 490, 494 with conditionals 492, 496 which when satisfied result in the inclusion of the sentence elements 493, 498 in the text of model 400. Finally, in node 410, an engine would evaluate bucket 442 by processing evaluation string 444 to determine whether the sentence element 446 should be included in the generated text. Concatenation of the node 410 would then be performed (again, concatenation is occurring at the node level).

For example, if the model variable "NumberAnalysts" was greater than zero (i.e., was 2) and the "Analyst1Rating" and "Analyst3Rating" variables were greater than or equal to four, an engine evaluating the model 400 would generate the text "It seems that Analyst1 and Analyst2 are most enthusiastic about this stock." This is achieved according to the invention by the combination of retrieving and processing current raw data to determine the model variables, by the use of decision tree model 400 to automate text generation, and the use of concatenation rules, e.g., in each node, to obviate the need for time-consuming and error-prone grammar and syntactic analysis. The model 400 is simple yet with its teaching it would be clear to those skilled in the art how this model 400 can readily be expanded with the inclusion of more child nodes and more complex bucket definitions and concatenation rules to create a much more complex generated text.

FIG. 5 illustrates a screen shot of a GUI or interface screen 500 that may be provided on the user interface 108 on user node 102. The interface screen 500 includes prompts or data entry points for a user to enter user input including a unique key or index and model selection for creation of text. The interface screen 500 further includes a results section for displaying the generated text to the user. In the illustrated example specific to a financial industry text generator, a dialog box 510 for entry of a unique key or index is provided, e.g., a box for entry of a stock symbol. The stock symbol then is used by a text generator in selecting a subset of raw data to be retrieved and used in determining model variable values. On the left side of the screen 500, an area 518 is provided for selecting a model under the label "Text models" 514. As shown, a user can select a model by choosing a model identifier, which is then related to a particular model type by the generator engine (such as by model type identifier or label). In other embodiments, a user does not specifically select the models for use by the generator engine, and instead, the user sets one or more choices (e.g., input variables such variables 510) that are then used by a mechanism in concert with the generator engine to choose an appropriate model. In other words, the generator engine may be configured to select or default to a model based on the user input rather than being directed by the user. The screen 500 further may include a number of other informational display items, such as market information 526, typically provided by the content server.

Once the text generator completes the generation of text, a results section 530 is provided for displaying the generated text 540. The exemplary generated text 540 includes a first sentence element 542 followed by a second sentence element 544. A third sentence element 550, which is separated from the second element 544 with connector element 548 and a fourth sentence element 560 by a second connector 556. The connectors may be punctuation marks, conjunctions, or simply spaces.

In some embodiments of the invention, the models 150, 194, 300, and 400 are created according to a set of model-building rules to ensure that the engine will be able to process the model and that resulting text will be useful and follow appropriate syntax and grammar rules. The following are a number of rules that may be implemented in creating models based on decision trees: (1) each node can have multiple buckets; (2) each node can generate only one value for bucket evaluation; (3) zero or more buckets can evaluate to true in each node; (4) buckets evaluate in a predetermined order such as smallest identifier to largest, left to right, or the like; (5) nodes can perform string concatenation; (6) buckets either point to another node or have a string or sentence element for display or inclusion in the generated text; (7) strings or sentence elements can include variable substitution with formatting; (8) a bucket typically cannot point to another bucket that is above its path of execution (to control infinite recursion); (9) in the process of getting a value for bucket evaluation, other data for variable may become available and these values can be used by the buckets that are contained in the node that generated the data or values; (10) child nodes generally will not have access to data available to the parent node or buckets with the exception of the model's input values (to control dependency between parent and child nodes); and (11) inputs to the model are available to all nodes and buckets in the model.

The above disclosure sets forth a number of embodiments of the present invention. Other arrangements or embodiments, not precisely set forth, could be practiced under the teachings of the present invention and as set forth in the following claims. For example, the above examples are provided in the English language but the use of the decision trees and concatenation rules allow the teachings of the present invention with nearly any language. The concatenation rules are selected to comply with the grammar and syntax rules of the language in which the text is being built or generated and likewise the sentence elements and connectors will be selected to be appropriate for a particular base language such as German, French, Italian, Japanese, Chinese, and other languages. Further, in one embodiment (not shown), a language translator is included in the system 100 of FIG. 1 that functions to receive the generated text 160 generated in a first source language and to translate it into a second generated text 112 delivered to the user node 102 in a second target language. Numerous configurations for the language translator may be implemented such as, but not limited to, the translators or translator devices including those taught in the following patents and patent applications, each of which are incorporated herein in their entirety by reference: U.S. Pat. No. 5,369,574 to Masegi, U.S. Pat. No. 5,890,182 to Yagisawa et al., U.S. Pat. No. 5,088,039 to Kugimiya et al., and U.S. Patent Application to Duan et al. with a Pub. No. US 2003/0036898 A1.

We claim:

1. A computer-based method for generating text, comprising:

selecting a model of a text, the model being a decision tree with a node having one or more buckets including a conditional element and a sentence element;

processing a set of raw data selected based on the selected model to determine a model variable;

evaluating the selected text model to identify a set of the sentence elements to include in the generated text, wherein the evaluating includes processing the conditional element of a bucket and when the conditional element is satisfied including the sentence element for the bucket in the identified set of the sentence elements; and combining the sentence elements in the identified set to form the generated text:

wherein the processing of one of the conditional elements includes retrieving the model variable determined from the processed set of raw data and comparing a value of the model variable with a predefined conditional value for the bucket and wherein each of the nodes of the selected text model include a set of concatenation rules for the sentence elements of the particular node and wherein the combining of the sentence elements includes concatenating the sentence elements for each of the nodes based on the sets of concatenation rules, the concatenation rules including definitions of connectors to be inserted between the sentence elements.

2. The method of claim 1, wherein the selected text model includes a plurality of the nodes each having one or more buckets pointing to another of the nodes or including one of the sentence elements.

3. The method of claim 1, further including receiving a user input comprising a unique key and retrieving the set of raw data from a data source based on the unique key.

4. The method of claim 3, wherein the user input further includes a model selection and the selecting includes processing the model selection to identify the selected model from a set of available text models.

5. The method of claim 1, further including transferring the formed text to a user node for display to a user.

6. The method of claim 1, wherein the set of raw data includes financial analysis information, the model variable is a financial analysis variable, and the sentence elements include text related to financial analysis.

7. A text generation system, comprising:

means for storing a set of text models, each of the text models being decision tree based and including a parent node and a plurality of child nodes each having one or more bucket elements, wherein at least some of the bucket elements include conditional elements and a sentence element;

means for storing a model database including retrieved raw data and model variables for a selected one of the text models;

a generator engine configured for identifying the selected one of the text models, for processing the retrieved raw data to determine the model variables, and for generating a text by processing the conditional elements to identify a set of the sentence elements and combining the identified sentence elements, wherein at least some of the buckets include multiple text strings and one of the text strings is randomly selected for inclusion in the text by the generator engine.

8. The system of claim 7, wherein the generator engine is further configured to receive a user input including a unique key and to select the retrieved raw data based on the unique key.

9. The system of claim 8, wherein the user input includes a model selection and the generator engine uses the model selection in performing the identifying of the selected one of the text models.

10. The system of claim 7, wherein at least some of the nodes include a set of concatenation rules and wherein the generator engine uses the concatenation rules during the combining of the identified sentence elements.

11. The system of claim 10, wherein the concatenation rules define connectors to be inserted by the generator engine between combined ones of the sentence element in the generated text.

12. A computer-based method for generating text, comprising:

receiving user input requesting that text be built, wherein the user input comprises a key and a model selection;

selecting a text model based on the model selection, the text model being a decision tree with nodes comprising buckets having a conditional element and a corresponding sentence element;

retrieve a set of raw data from a data source based on the key and on the text model;

processing the set of raw data to determine model variables defined by the text model;

evaluating the selected text model to identify a set of the sentence elements to include in the text, wherein the evaluating includes processing the conditional elements of at least some of the buckets using the determined model variables and when the conditional elements are satisfied including the corresponding sentence elements for the buckets in the identified set of the sentence elements; and combining the sentence elements in the identified set to form the text;

wherein at least some of the buckets include multiple text strings and one of the text strings is randomly selected for inclusion in the text.

13. The method of claim 12, wherein each of the nodes of the text model includes a set of concatenation rules for the sentence elements of the particular node and wherein the combining of the sentence elements includes concatenating the sentence elements for each of the nodes separately based on the sets of concatenation rules.

14. The computer readable medium method of claim 13, wherein the concatenation rules include definitions of connectors to be inserted between the sentence elements and wherein at least one of the sets of the concatenation rules differs from at least another one of the sets of the concatenation rules, whereby combination of the sentence elements at the nodes is performed uniquely at the corresponding nodes.

15. The computer readable medium method of claim 12, wherein the key is a securities symbol, the set of raw data includes financial analysis information, the model variable is a financial analysis variable, and the sentence elements include text related to financial analysis.

16. The method of claim 12, wherein the one of the text strings is selected randomly and without repetition within the text.

17. The method of claim 12 wherein at least some of the sentence elements comprise one or more of the determined model variables, whereby the determined model variables are presented in the text.

* * * * *

UNITED STATES PATENT AND TRADEMARK OFFICE
CERTIFICATE OF CORRECTION

PATENT NO. : 7,376,552 B2 Page 1 of 1
APPLICATION NO. : 10/639274
DATED : May 20, 2008
INVENTOR(S) : Hander et al.

It is certified that error appears in the above-identified patent and that said Letters Patent is hereby corrected as shown below:

Column 16, line 45, delete "computer readable medium".
Column 16, line 53, delete "computer readable medium".

Signed and Sealed this

Twenty-second Day of July, 2008

JON W. DUDAS
*Director of the United States Patent and Trademark Office*